Feb. 23, 1937.  C. H. COBERLY  2,071,320
CLARIFIER
Filed Oct. 22, 1935   2 Sheets-Sheet 1
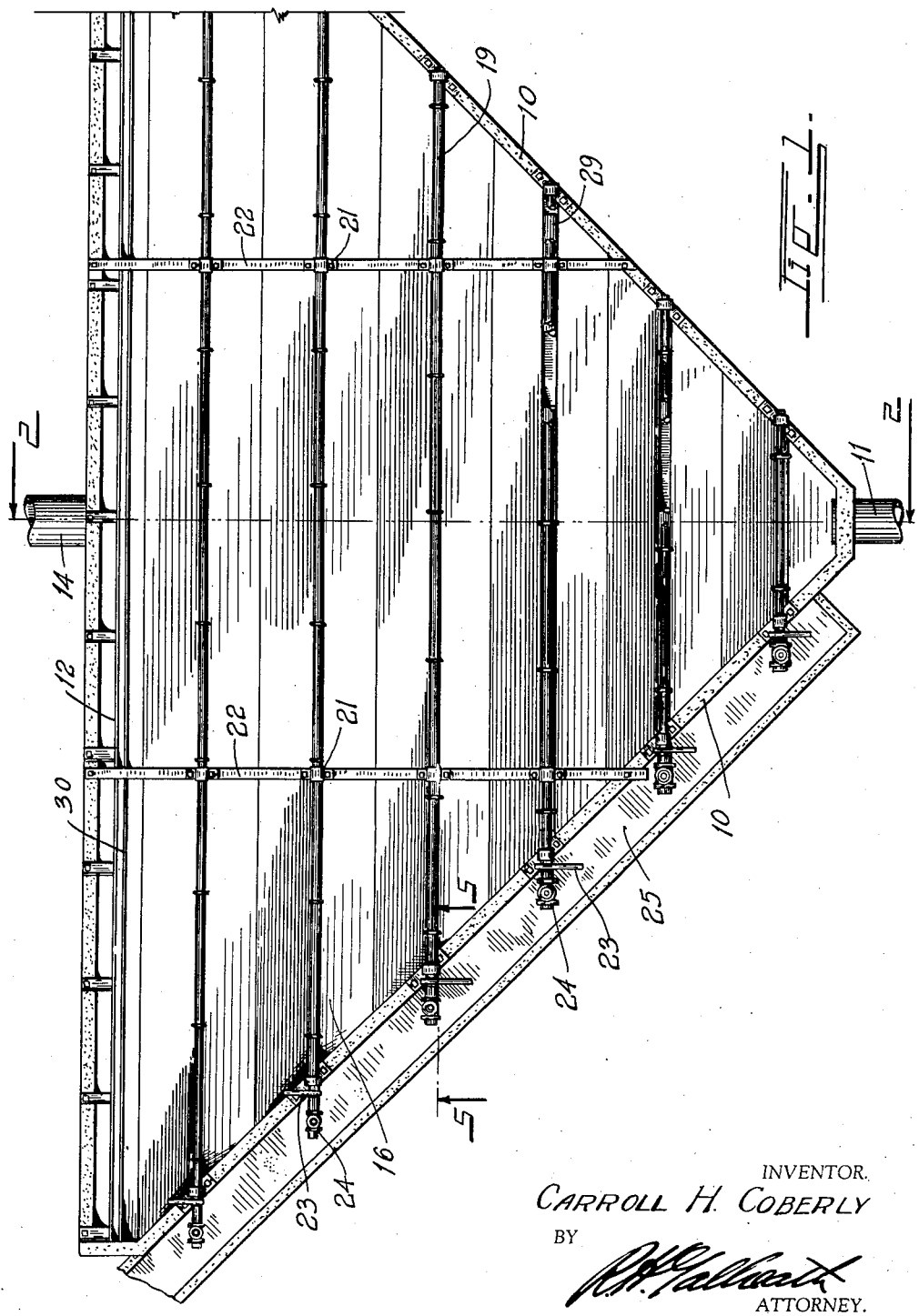
INVENTOR.
CARROLL H. COBERLY
BY
ATTORNEY.

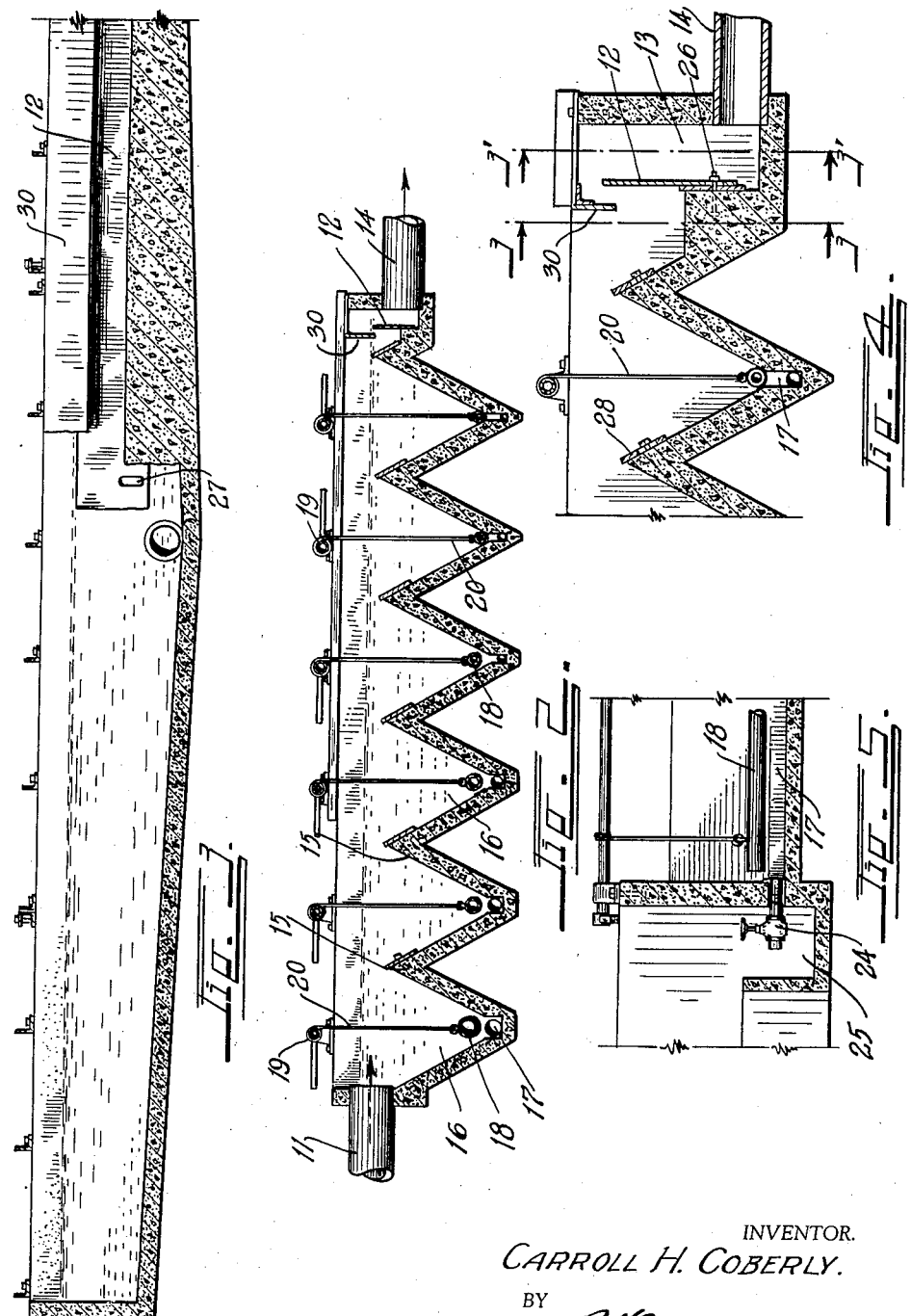

Patented Feb. 23, 1937

2,071,320

UNITED STATES PATENT OFFICE 2,071,320

CLARIFIER

Carroll H. Coberly, Denver, Colo.

Application October 22, 1935, Serial No. 46,110

5 Claims. (Cl. 210—57)

This invention relates to a clarifier for separating and removing suspended solids from solutions. It is particularly useful for water purifications, sewage disposal, metallurgical dewatering, etc. The principal object of the invention is to provide a continuous clarifier of high capacity and maximum efficiency.

In the usual clarifier or settling tank, the solution is subjected to a period of low or no velocity, during which the suspended solids gravitate or settle to the bottom and the clear solution is drawn off from the top. Such a practice does not admit of efficient continuous operation and is not highly effective due to the fact that it is impossible to obtain uniform quiescence throughout the entire tank contents. The latter may be accounted for by the constant mixing of the water from top to bottom and to the formation of vortex currents of sufficient velocity to lift and hold suspended.

The vortex currents are probably due to the motion of the water at time of admission and to variations in temperature between the top and bottom of the tank, surface winds, etc., all of which interfere with effective settling.

In this invention a clarifier is provided which will not be dependent on quiescent settling action, nor upon reduced velocities for deposition of its solids; and which will effectively clarify a continuously flowing stream of solution.

A further object is to provide a clarifier from which the collected solids can be quickly and easily removed at any desired intervals without interfering with the continuous operation of the clarifier.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a plan view of a clarifier constructed according to the present invention.

Fig. 2 is a cross section therethrough, taken on the line 2—2, Fig. 1.

Fig. 3 is a longitudinal section taken on the line 3—3, and 3'—3', Fig. 4.

Fig. 4 is an enlarged detail section through the discharge extremity.

Fig. 5 is a detail section through one edge of the clarifier, and sediment launder, taken on the line 5—5, Fig. 1.

The invention comprises a relatively large shallow basin or tank 10 having a relatively narrow intake side and a relatively wide discharge side. A triangular basin is ideal for the purposes of this invention. The solution is fed to the basin 10 at the apex of the triangle through an influent pipe 11. It overflows throughout the entire length of the base of the triangle over a suitable overflow weir 12. The overflow is received in a discharge launder 13 from which it is discharged through an effluent pipe 14.

The bottom of the basin is formed with a series of ridges 15 parallel to each other and parallel to the base of the triangle and to the overflow weir 12. The ridges 15 separate a series of V-shaped, longitudinally extending collection chambers 16. A sediment trough 17 extends longitudinally throughout the bottom of each of the chambers 16.

The sediment troughs may be closed or covered by means of cover pipes 18 each of a size to fit snugly into the V-shaped bottom of its chamber 16. These cover pipes can be raised or lowered in any desired manner. One method by rotating a series of suspension is to suspend each of the cover pipes from a supporting pipe or shaft 19. The pipes or shafts 19 extend across the top of the basin 10 over each of the troughs 17. The cover pipes 18 are suspended from the shafts 19 by means of suitable flexible cables 20, at suitable intervals. The suspension shafts 19 are rotatably mounted in bearings 21 along the sides of the tank and upon suitable supporting beams 22 over the tank and can be rotated by means of suitable levers 23, with which each of the shafts is provided.

If the levers are thrown in one direction they will unreel the cables from the shafts 19, allowing the cover pipes to lower into the bottoms of the chambers 16 over the trough 17, and when thrown in the other direction, they will reel the cables 20 about the shafts 19 so as to lift the cover pipes 18 from the bottoms of the chambers 16 to uncover the troughs 17. Each of the troughs 17 is provided at its discharge extremity with a gate valve 24 which opens into a sediment launder 25 along one of the inclined sides of the basin.

The cover pipes do not extend the full length of the troughs 17 but terminate short of the extremity remote from the gate valve 24, as shown at 29 on the drawings.

It is desired to call particular attention to the fact that the first ridge 15, adjacent the overflow weir 12, and that the intermediate ridges 15 successively increase in height as the discharge is approached. Therefore the depth of solution over the ridges constantly decreases toward the discharge, and the width of the tank owing to its triangular shape, constantly increases toward the discharge so that the cross sectional area of the solution over all of the ridges is substantially uniform. Therefore, the velocity of flow across all of the ridges will be uniform, but the depth over each successive ridge will constantly decrease.

It is preferred to have a certain amount of vertical adjustment in the discharge weir 12 in order to obtain the desired depth of flow over the ridges for the particular solution being treated and to obtain a uniform depth throughout the length of the ridges. This may be accomplished by placing the attachment bolts 26 of the weir plate through slotted openings 27 in the weir as illustrated.

It is essential that the level of the ridges be substantially uniform and to accomplish this in concrete construction is somewhat difficult. Any inaccuracies, however, can be corrected by placing edge plates 28 along the apex of each of the ridges and leveling these plates so as to provide a perfect level edge along each ridge.

The principle of operation can best be described as follows: a particle of sediment in water has a downward pull equal to the difference specific gravity between that of the particle and the water. There are two forces opposed to this pull, the friction of the water on the surface of the particle, and the viscosity of the water. If the surface area of a particle is small and the downward velocity is low, the actual friction, except in very large particles, is so small as to be disregarded entirely, and the viscosity of the water is the only force to be considered. The finer the particle, therefore, the slower will be its rate of settling in the solution. If the solution is flowing at a uniform velocity during the settling operation, the particles will move downwardly and forwardly on a diagonal line or resultant between the force of gravity and the force of the current. The heavier the particle, the steeper will be the incline, of the diagonal descent due to the greater gravitational pull.

In the triangular basin 10, the solution is flowing forwardly toward the discharge at a uniform velocity, due to the fact that the basin widens as its depth decreases. The heaviest particles will descend at an abrupt angle and strike the first and deepest ridge 15 which will separate them from the flow and allow them to settle into the first chamber 16. The next heaviest particles will decend on a less abrupt angle, pass over the first ridge, and strike against the second. This action continues with each ridge in turn intercepting particles smaller and lighter than the preceding ridges. The exceedingly finest material will settle along a very slight incline and will be intercepted by the final ridge 15 which is positioned very close to the surface of the fluid.

It is desired to call attention to the fact that this clarifier provides a variable settling depth and a variable settling time interval depending upon the settling rate of the particle. That is, the exceedingly fine particles have a longer settling time and a shallower settling depth than the heavier particles. The thin sheet of fluid flowing over the last ridge will be the clear top layer from which even the finest materials have settled.

When the troughs 17 are sufficiently filled with sediment to require cleaning, the cover pipes 18 are lowered onto the tops of the troughs. As before stated, these pipes are slightly shorter than the troughs so as to leave the top of the trough open at the far end. The valves 24 communicating with the troughs to be cleaned are then opened, and the fluid pressure enters the open end of the trough beyond the cover pipe, thereby creating a pressure which forces the sediment longitudinally of the trough and out through the valve 24.

It has been found that if the covering pipes 18 are not employed, it is impossible to flush out the entire length of the trough 17 since the water will flow out through the valves 24 from the closest point without flowing through the entire length of the trough.

A baffle plate 30 as positioned immediately ahead of the overflow weir 12 to break the surface velocity of the flow over the weir, and maintain the velocity over the last ridge 15 substantially uniform with the velocity over the preceding ridges.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A clarifier for solutions comprising: a basin having a narrow intake extremity and a relatively wide discharge extremity so that the width of the stream in flowing across said basin gradually increases; a series of parallel ridges in the bottom of said basin lateral to the line of flow; said ridges increasing in height as the discharge extremity is approached so that the depth of solution over each ridge will successively decrease toward the discharge.

2. A clarifier for solutions comprising: a basin having a narrow intake extremity and a relatively wide discharge extremity so that the width of the stream in flowing across said basin gradually increases; a series of parallel ridges in the bottom of said basin positioned laterally to the line of flow; said ridges increasing in height as the discharge extremity is approached so that the depth of solution over each ridge will successively decrease toward the discharge; a settling chamber between each pair of ridges; and means for removing the sediment from said chambers.

3. A clarifier comprising: a substantially triangular basin; means for admitting influent at the apex of said basin; means for discharging effluent along the side opposite said apex; and a series of parallel ridges extending upwardly from the bottom of said tank parallel with said latter side.

4. A clarifier comprising: a substantially triangular basin; means for admitting influent at the apex of said basin; means for discharging effluent along the side opposite said apex and a bottom for said tank, said bottom inclining upwardly toward the discharge side so as to successively decrease the depth of solution therein; and a series of parallel ridges extending upwardly from the bottom of said tank parallel with said discharge side.

5. A clarifier comprising: a substantially triangular basin; means for admitting influent at the apex of said basin; means for discharging effluent along the side opposite said apex; and a series of parallel ridges extending upwardly from the bottom of said tank parallel with said latter side; said ridges gradually increasing in height as the discharge side is approached.

CARROLL H. COBERLY.